(12) United States Patent
Keller et al.

(10) Patent No.: US 7,076,596 B1
(45) Date of Patent: Jul. 11, 2006

(54) METHOD OF AND APPARATUS FOR ENABLING A HARDWARE MODULE TO INTERACT WITH A DATA STRUCTURE

(75) Inventors: Eric R. Keller, Boulder, CO (US); Philip B. James-Roxby, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 491 days.

(21) Appl. No.: 10/354,493

(22) Filed: Jan. 30, 2003

(51) Int. Cl.
*G06F 12/00* (2006.01)
(52) U.S. Cl. .............................. 711/1; 711/220; 711/221
(58) Field of Classification Search ................ 711/1, 711/220, 221; 707/100
See application file for complete search history.

(56) References Cited

U.S. PATENT DOCUMENTS 5,457,408 A * 10/1995 Leung ..................... 326/38
6,091,263 A * 7/2000 New et al. ................ 326/40

OTHER PUBLICATIONS

U.S. Appl. No. 10/354,518, filed Jan. 30, 2003, Keller et al.

* cited by examiner

*Primary Examiner*—Jack Lane
(74) *Attorney, Agent, or Firm*—John King; Kim Kanzaki

(57) ABSTRACT

A method of enabling a hardware module to interact with a data structure is disclosed. The method comprises the steps of enabling the hardware module to determine an address of a data item referenced by the data structure; providing a base address for the data structure to the hardware module; and accessing a data item referenced by the data structure. A field programmable gate array having a hardware module capable of interacting with a data structure is also described. The field programmable gate array comprises a memory having a data structure; a hardware module coupled to the memory and comprising a lookup table; and a target address generated by the hardware module for a data item of the data structure.

33 Claims, 3 Drawing Sheets

METHOD OF AND APPARATUS FOR ENABLING A HARDWARE MODULE TO INTERACT WITH A DATA STRUCTURE

FIELD OF THE INVENTION

This invention relates generally to integrated circuits, and in particular, to a method of and an apparatus for enabling a hardware module to interact with a data structure.

BACKGROUND OF THE INVENTION

Programmable logic devices, such as field programmable gate arrays (FPGA), enable the fast, efficient, and low-cost implementation of circuits in electronic devices. Programmable logic devices generally include logic elements which can be configured to implement logic functions. A portion of the programmable logic device can be partitioned to implement a plurality of hardware modules. That is, these hardware modules can be programmed as needed to implement a desired function of the programmable logic device.

However, there is no current mechanism for hardware modules to directly modify complex software structures. Software interacting with hardware and vice versa is usually done by primitive data types which have a natural equivalent in each domain. For example, an integer in C corresponds to 32 wires in hardware or a 32 bit register. Hardware which wishes to read and modify this value over a system bus can simply request the 32 bits stored at a certain memory location, and write back the new value to the memory location. However, data structures have no natural equivalent in hardware.

Accordingly, there is a need for a method of and apparatus for enabling a hardware module to interact with a data structure.

SUMMARY OF THE INVENTION

A method of enabling a hardware module to interact with a data structure is disclosed. The method comprises the steps of enabling the hardware module to determine an address of a data item; providing a base address for the data structure to the hardware module; and accessing a data item referenced by the data structure.

A field programmable gate array having a hardware module capable of interacting with a data structure is also described. The field programmable gate array generally comprises a communication interface receiving a base address of the data structure; a hardware module coupled to the communication interface and comprising a lookup table; and a target address generated by the hardware module for a data item of the data structure.

DETAILED DESCRIPTION OF THE DRAWINGS

The interaction between hardware and software modules currently involves the passing of data of predefined types such as 32 bit integers. However, software is often written using more complex data structures (e.g. structs and objects in C/C++). The method and apparatus of an embodiment of the present invention allows for passing of complex structures between hardware and software. Only the pointer to the complex structure is passed, as opposed to each individual field. This reduces communication overhead by allowing the hardware module the ability to interact with the data structure directly instead of having to go through the processor. The methodology involves providing logic facilities in the hardware module for the software compiler to modify, which then allow the hardware module to seamlessly read and modify the data structure over a defined communication structure.

Components are provided in the hardware which can be modified by an extended compiler to perform the equivalent pointer arithmetic for data structures. The base address for a data structure is easily obtained from software, the offset of each item within the structure can be obtained either within the compiler, or after compilation by examining the address of individual fields within the structure. The components within the hardware will be a look-up table, which when combined with the structure base address will give the target address for a memory transfer of a data item.

Figure 1:
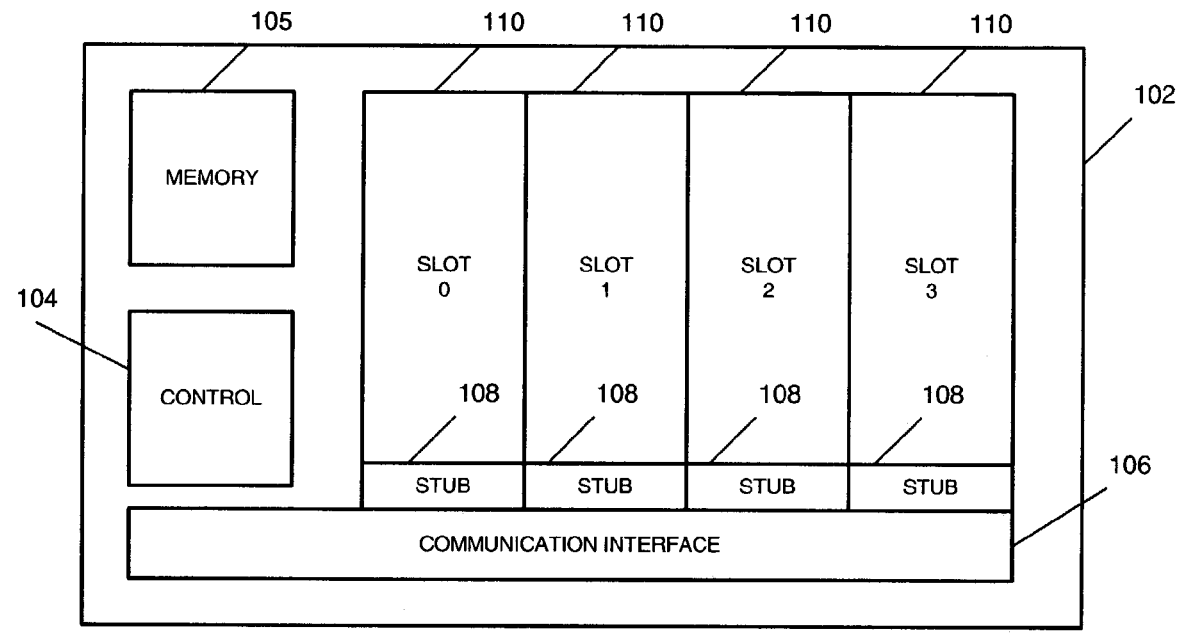
FIG. 1 is a block diagram of a reference platform according to an embodiment of the present invention.

Turning now to the figures, a block diagram of a reference platform according to an embodiment of the present invention is shown in FIG. 1. In particular, a reference platform 102 comprises a controller 104 and a memory 105. Although the memory 105 is shown as a part of the programmable logic device, the memory 105 could be provided separate from the programmable logic device. The reference platform further comprises a communication interface 106 coupled to a plurality of stubs 108. The communication interface generally includes routing logic, while the stubs 108 generally include bus decoding logic. The communication interface and stubs are preferably programmable logic, but remain static circuits for the reference platform. Finally, a plurality of user configurable slots 110 enable the programmable logic device to be employed having user definable hardware modules.

Figure 2:
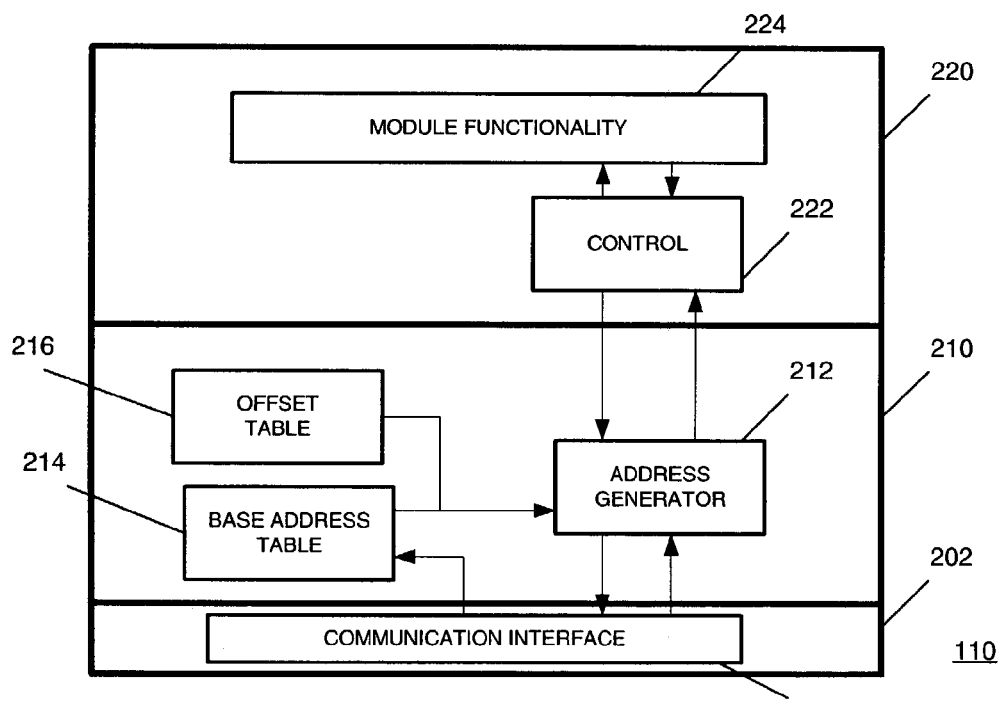
FIG. 2 is a block diagram of a hardware module implemented in the reference platform according to an embodiment of the present invention.

Turning now to FIG. 2, a block diagram of a hardware module implemented in the reference platform according to an embodiment of the present invention is shown. The module consists of three parts. The bottom part 202 comprises a communications interface which acts as the buffer between the struct wrapper and other elements of the system employing the programmable logic devices.

The middle part is a struct wrapper 210 which contains a series of look-up tables. A single offset table is preferably produced per structure type, and is a read/write look-up table containing as many data items as there are fields in the structure. The contents of the offset table are preferably set by the extended compiler based on information obtained about the packing of the structure type during the compilation process. A base address table is produced per structure type, and contains as many entries as there are instances of the structure type. The contents of the base address table are set preferably during application run time. When the operator requests a data item from within the structure, it is done with reference to the base structure itself and the field name. The relevant look-up table is addressed, and the memory location of the item is produced from the struct wrapper. The data would then be accessed from a memory, such as the memory 105, accessible by the hardware module. An advantage of the wrapper is that it may contain cache, which would minimize transfers for items already present. The struct wrapper requests a data transfer and provides the base address.

The top part is an operator 202 that performs the useful computation of the module, and will operate on a combination of basic data items and structures. This part would be initially designed using standard design techniques and automatically transformed to interact with the other layers.

Figure 3:
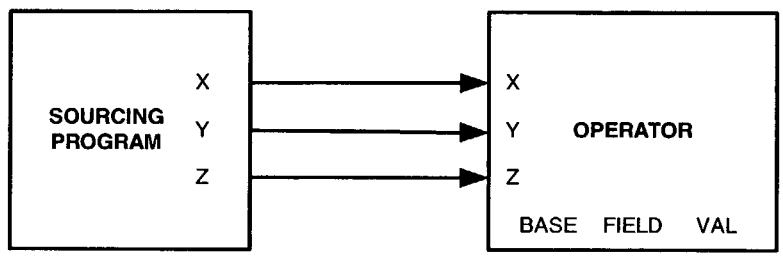
FIG. 3 is a block diagram showing two modules communicating over three channels with complex data types.
Figure 4:
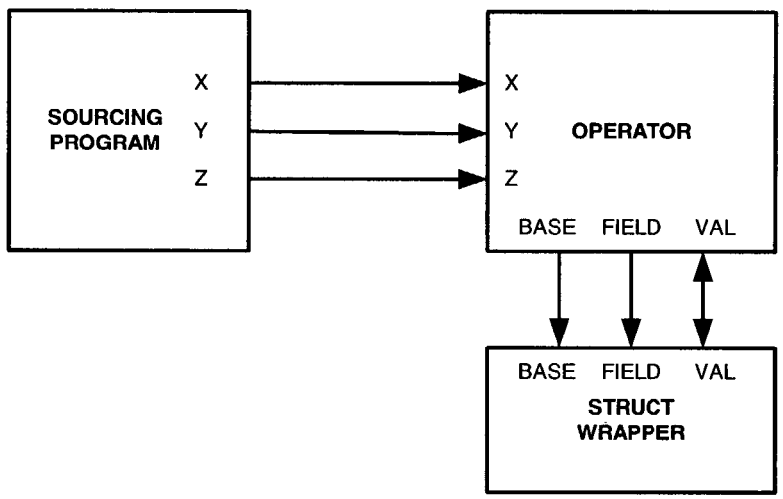
FIG. 4 is a block diagram showing the implementation of a struct wrapper and primitive data types in place of a high level model using structs.

Turning now to FIGS. 3 and 4, the block diagram shows the transformation of an operator using high level data types. Initially, the operator would be designed in a language supporting software structures such as System C. The operator would simply get structures, manipulate them and store them. As an example, consider an operator module (FIG. 3) which adds two complex numbers producing a third. Initially, to describe FIG. 3 we would simply write:

```
typedef struct {
    int real;
    int imag;
} complex;
complex *xt;
complex *yt;
complex *zt;
xt = x.read( ); // x is a port;
yt = y.read( );
zt->real = xt->real + yt->real;
zt->imag = xt->imag + yt->imag;
z.write(zt);
```

The operator would initially be driven from a sourcing program, as shown for example in FIG. 3, as follows:
High Level Source
```
complex val_x = {3, 2};
complex val_y = {2, 9};
complex *val_z;
x.write(val_x);
y.write(val_y);
val_z = z.read( );
```

This would be simulated for correctness. The compiler when it compiles the program would determine the packing. The operator and sourcing program would then be automatically transformed to the modules shown in FIG. 4 as follows:
Transformed operator (e.g. the operator shown in FIG. 4)
```
#define REAL 0 (e.g. an offset)
#define IMAG 1 (e.g. an offset)
int xt, yt, zt; (e.g. a base address)
xt = x.read( );
yt = y.read( );
zt = z.read( );
hot_mod_var.write(xt);
hot_mod_var.write(REAL);
int temp_x = hot_mod_val.read( );
hot_mod_var.write(yt);
hot_mod_field.write(REAL);
int temp_y = hot_mod_val.read( );
hot_mod_var.write(zt);
hot_mod_field.write(REAL);
hot-mod-val.write(temp_x + temp_y);
hot_mod_var.write(xt);
hot_mod_var.write(IMAG);
temp_x = hot_mod_val.read( );
hot_mod_var.write(yt);
hot_mod_var.write(IMAG);
temp_y = hot_mod_val.read( );
hot_mod_var.write(zt);
hot_mod_field.write(IMAG);
hot_mod_val.write(temp_x + temp_y);
```
Transformed Hot Mod (e.g. struct wrapper module in FIG. 4):
```
int base = var.read( );
int ix = field.read( );
int v = *(base + offsetTable[ix]);
val.write(v);
```

This transformation gives rise to the structure shown in FIG. 2. This in turn can be simulated. More importantly, the new structure can be directly synthesised into hardware, since it no longer contains any high-level data types. It is possible to either develop or acquire libraries of hardware components which support this direct structure manipulation. A software-centric flow then exists which operates in a similar manner to the flow described above. As long as software using the same structure as the hardware exists, then the modified compiler can fill in the tables in the hardware, and the software and hardware module can directly communicate.

Figure 5:
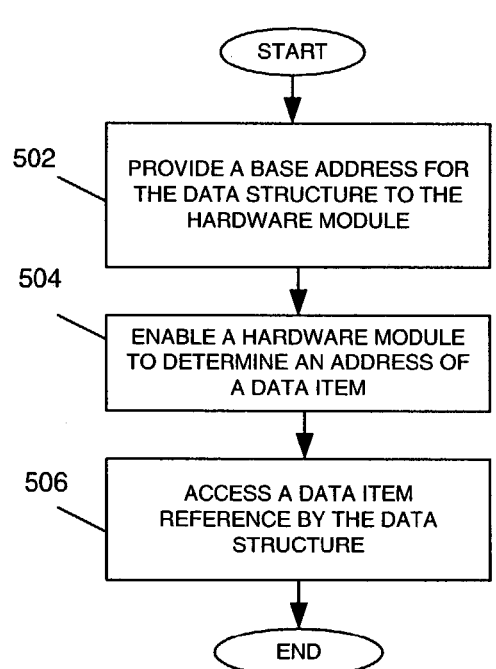
FIG. 5 is a flowchart showing a method of enabling a hardware module to interact with a data structure according to an embodiment of the present invention.

Turning now to FIG. 5, a flowchart shows a method of enabling a hardware module to interact with a data structure according to an embodiment of the present invention. In particular, a base address for the data structure is provided to the hardware module at a step 502. A hardware module is enabled to determine an address of a data item referenced by a data structure at a step 504 The data item of reference by the data structure is then accessed at a step 506.

Figure 6:
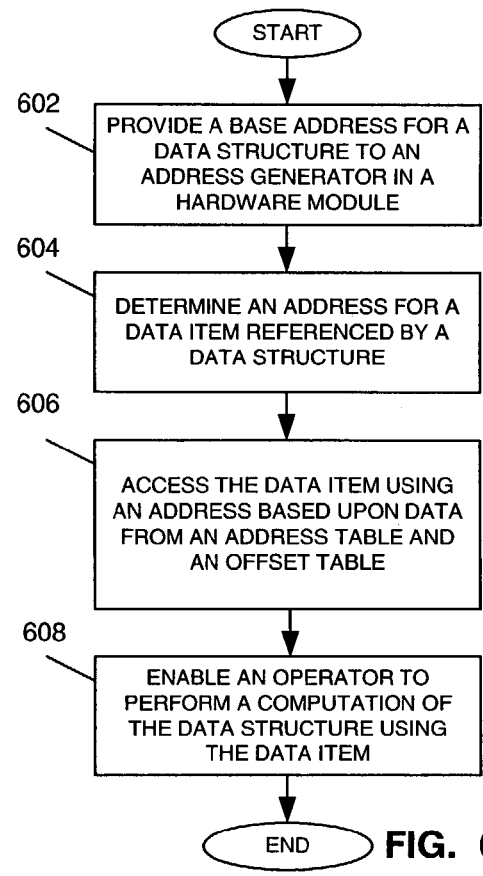
FIG. 6 is a flowchart showing a method of enabling a hardware module to interact with a data structure by way of a lookup table in hardware according to an embodiment of the present invention.

Turning now to FIG. 6, a flowchart shows a method of enabling a hardware module to interact with a data structure by way of lookup tables and hardware according to an embodiment of the present invention. In particular, a base address for a data structure is provided to an address generator in a hardware module at a step 602. An address for a data item referenced by a data structure is determined at a step 604. The data item is accessed using an address based upon data from an address table and an offset table at a step 606. Finally, an operator is enabled to perform a computation of the data structure using the data item at a step 608.

Figure 7:
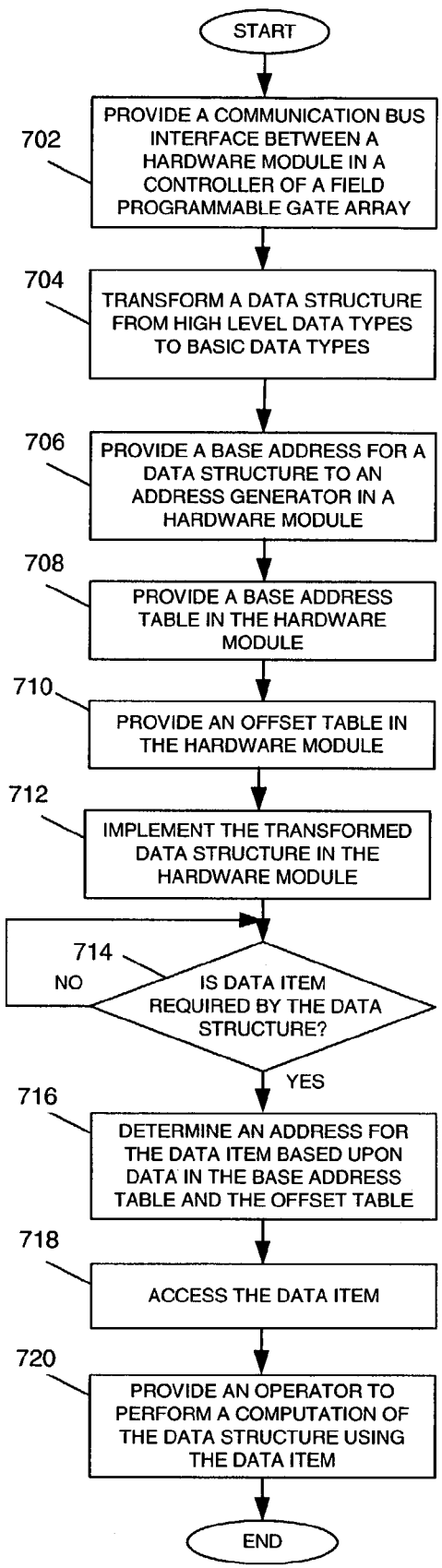
FIG. 7 is a flowchart showing a method of enabling a hardware module to performing a computation of a data structure according to an embodiment of the present invention.

Turning now to FIG. 7, a flowchart shows a method of enabling a hardware module to perform a computation of a data structure according to an embodiment of the present invention. In particular, a communication interface is provided between a hardware module and a controller of a field programmable gate array at a step 702. The data structure is transformed from high-level data types to basic data types at a step 704. A base address for a data structure is provided to an address generator in a hardware module at a step 706. A base address table is provided in the hardware module at a step 708. An offset table is provided in the hardware module at a step 710. The transformed data structure is implemented in the hardware module at a step 712. It is then determine whether a data item is required by the data structure at a step 714. If so, an address for the data item is determined based upon data in a base address table and an offset table at a step 716. The data item is then accessed at a step 718, and an operator is provided to perform a computation of the data structure using the data item at a step 720.

One advantage of the embodiments of the present invention is that it provides the ability to deal with complex data structures in hardware in a manner which directly supports codesign. Because the transformation of code and instantiation of the struct wrapper is done automatically as part of the compilation process, moving tasks between software and hardware implementations is greatly simplified. That is, the specification of modules which can be either hardware or software. Software tasks will communicate with hardware modules on a defined platform via a communications interface. The system design task becomes the mapping of parts of the overall problem into software and hardware. We impose structure on the hardware modules to allow them to transparently communicate with the processor. By allowing hardware modules to directly interact with complex data structures, the need to laboriously and manually translate the complex data structure into a series of basic types is removed. Unlike prior art methods, the method and apparatus of the embodiments of the present invention allow hardware to access structures transparently.

It can therefore be appreciated that the new and novel method and system for enabling a hardware module to interact with a data structure has been described. It will be appreciated by those skilled in the art that, given the teaching herein, numerous alternatives and equivalents will be seen to exist which incorporate the disclosed invention. As a result, the invention is not to be limited by the foregoing embodiments, but only by the following claims.

What is claimed is:

1. A method of enabling a hardware module to interact with a data structure, the method comprising the steps of:
   enabling said hardware module to determine an address of a data item;
   providing a base address for said data structure to said hardware module; and
   accessing a data item referenced by said data structure.

2. The method of claim 1 further comprising a step of providing a base address table having said base address for said data structure.

3. The method of claim 2 further comprising a step of providing an offset table, wherein said step of accessing a data item referenced by said data structure comprises receiving information from said base address table and said offset table.

4. The method of claim 1 further comprising a step of providing an operator within said hardware module to perform a computation based upon said data item.

5. A method of enabling a hardware module to interact with a data structure, the method comprising the steps of:
   providing a base address for said data structure to said hardware module;
   enabling said hardware module to determine an address of a data item;
   determining the address of a data item referenced by said data structure; and
   enabling an operator within said hardware module to perform a computation of said data structure using said data item referenced by said data structure.

6. The method of claim 5 wherein said step of determining an address of a data item referenced by said data structure comprises implementing a plurality of lookup tables in said hardware module.

7. The method of claim 5 wherein said step of providing a base address for a data structure to said hardware module comprises passing a pointer to said hardware module.

8. The method of claim 5 wherein said step of determining the address of a data item referenced by said data structure comprises using an address table in said hardware module to determine an address of said data structure.

9. The method of claim 8 further comprising a step of using an offset table to determine an offset of said data item.

10. The method of claim 9 further comprising a step of providing a data item referenced by said data structure based upon data stored in said address table and said offset table.

11. A method of enabling a hardware module to interact with a data structure, the method comprising the steps of:
    providing a base address for a data structure to an address generator in said hardware module;
    determining an address for a data item associated with said data structure based upon data from an address table and an offset table; and
    accessing said data item.

12. The method of claim 11 wherein said step of determining an address for a data item comprises passing a pointer to said hardware module.

13. The method of claim 11 wherein said step of determining an address for a data item comprises providing said address table having address information for a plurality of data structures.

14. The method of claim 13 wherein said step of determining an address for data item comprises providing said offset table having offset information for a plurality of data items associated with said plurality of data structures.

15. The method of claim 11 further comprising a step of enabling an operator within said hardware module to perform a computation of said data structure.

16. A method of enabling a hardware module to interact with a data structure, said method comprising the steps of:
    providing a base address for a data structure to an address generator in said hardware module;
    providing an address table in said hardware module, said address table having address information for a plurality of data structures;
    providing an offset table in said hardware module, said offset table having offset information for a plurality of data items associated with said plurality of data structures;
    accessing a predetermined data item based upon data in said address table and said offset table; and
    providing an operator to perform a computation using said data item.

17. The method of claim 16 further comprising a step of enabling passing a pointer to said hardware module.

18. The method of claim 16 wherein said data item is required by said operator to perform a computation of said data structure.

19. The method of claim 16 further comprising a step of transforming said data structure from high-level data types to basic types.

20. The method of claim 19 further comprising a step of implementing said transformed data structure as hardware in said hardware module.

21. A method of enabling a hardware module to interact with a data structure, said method comprising the steps of:
    providing a communication interface between said hardware module and a controller of a field programmable gate array;

providing a base address for a data structure to an address generator in said hardware module;

providing a base address table in said hardware module;

providing an offset table in said hardware module;

determining an address for a data item referenced in a set of data structure based upon data in said base address table and said offset table;

accessing said data item; and providing an operator to perform a computation of said data structure using said data item.

22. The method of claim 21 further comprising a step of transforming said data structure from high-level data types to basic data types.

23. The method of claim 22 further comprising a step of implementing said transformed data structure as hardware.

24. The method of claim 21 further comprising a step of providing a communication bus between said communication interface and said controller.

25. A method of enabling a hardware module to interact with a data structure, said method comprising the steps of:

providing a communication bus between said hardware module and a controller of a field programmable gate array;

transforming said data structure from high-level data types to basic data types;

implementing said transformed data structure in said hardware module;

providing a base address for said transformed data structure to an address generator in said hardware module;

providing a base address table in said hardware module;

providing an offset table in said hardware module;

determining an address for a data item of said transformed data structure based upon data in said base address table and said offset table;

accessing said data item; and providing an operator to perform a computation of said transformed data structure using said data item.

26. A programmable logic device having a hardware module capable of interacting with a data structure, the programmable logic device comprising:

a communication interface receiving a base address of said data structure;

a hardware module coupled to said communication interface and comprising a lookup table; and a target address generated by said hardware module for a data item of said data structure.

27. The programmable logic device of claim 26 further comprising a controller coupled to said communication interface.

28. The programmable logic device of claim 26 wherein lookup table comprises a base address lookup table having information related to said base address.

29. The programmable logic device of claim 28 further comprising an offset lookup table having offset information for fields within said data structure.

30. The programmable logic device of claim 26 wherein said hardware module further comprises an operator performing a computation of said data structure.

31. A programmable logic device having a hardware module capable of interacting with a data structure, said field programmable gate array:

a controller;

a communication interface coupled to said controller;

a hardware module coupled to said communication interface;

a base address table implemented in said hardware module and having an entry associated with said data structure; and an offset table implemented in said hardware module and having an entry associated with a data item of said data structure.

32. The programmable logic device of claim 31 further comprising a memory coupled to said controller.

33. The programmable logic device of claim 31 further comprising an operator implemented in said hardware module and receiving said data item.

\* \* \* \* \*